Sept. 27, 1955     W. H. TANGEMAN     2,718,742
LAWN EDGER
Filed April 7, 1952     2 Sheets-Sheet 1
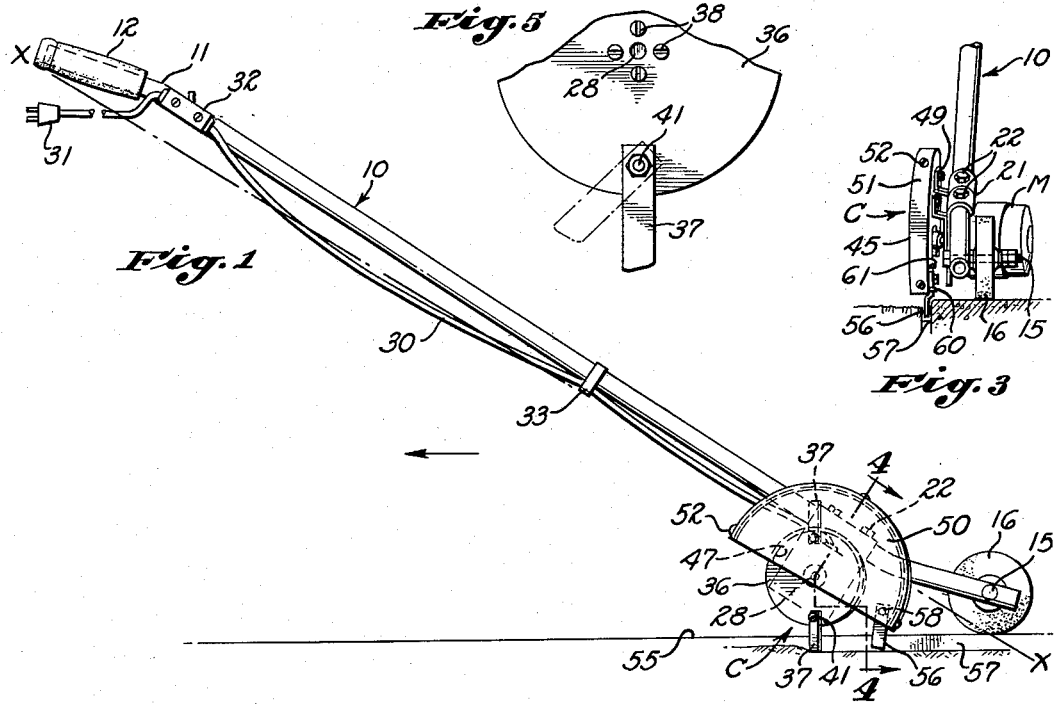
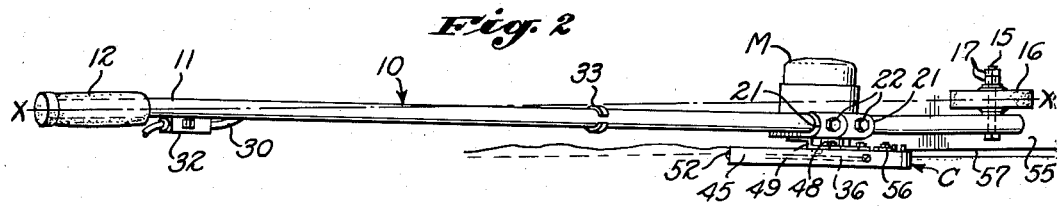
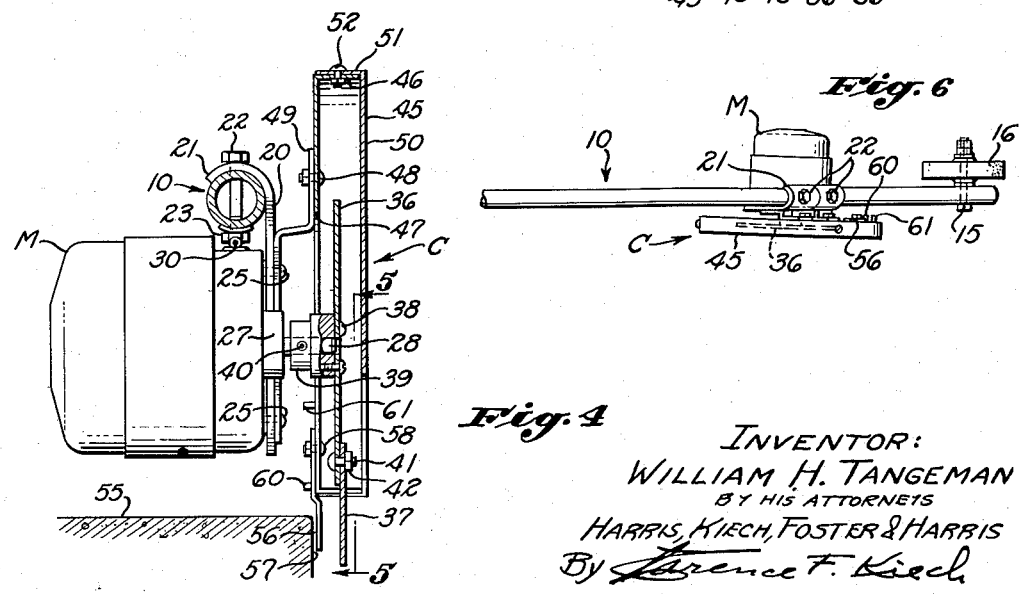
INVENTOR:
WILLIAM H. TANGEMAN
BY HIS ATTORNEYS
HARRIS, KIECH, FOSTER & HARRIS
By Lawrence F. Kiech

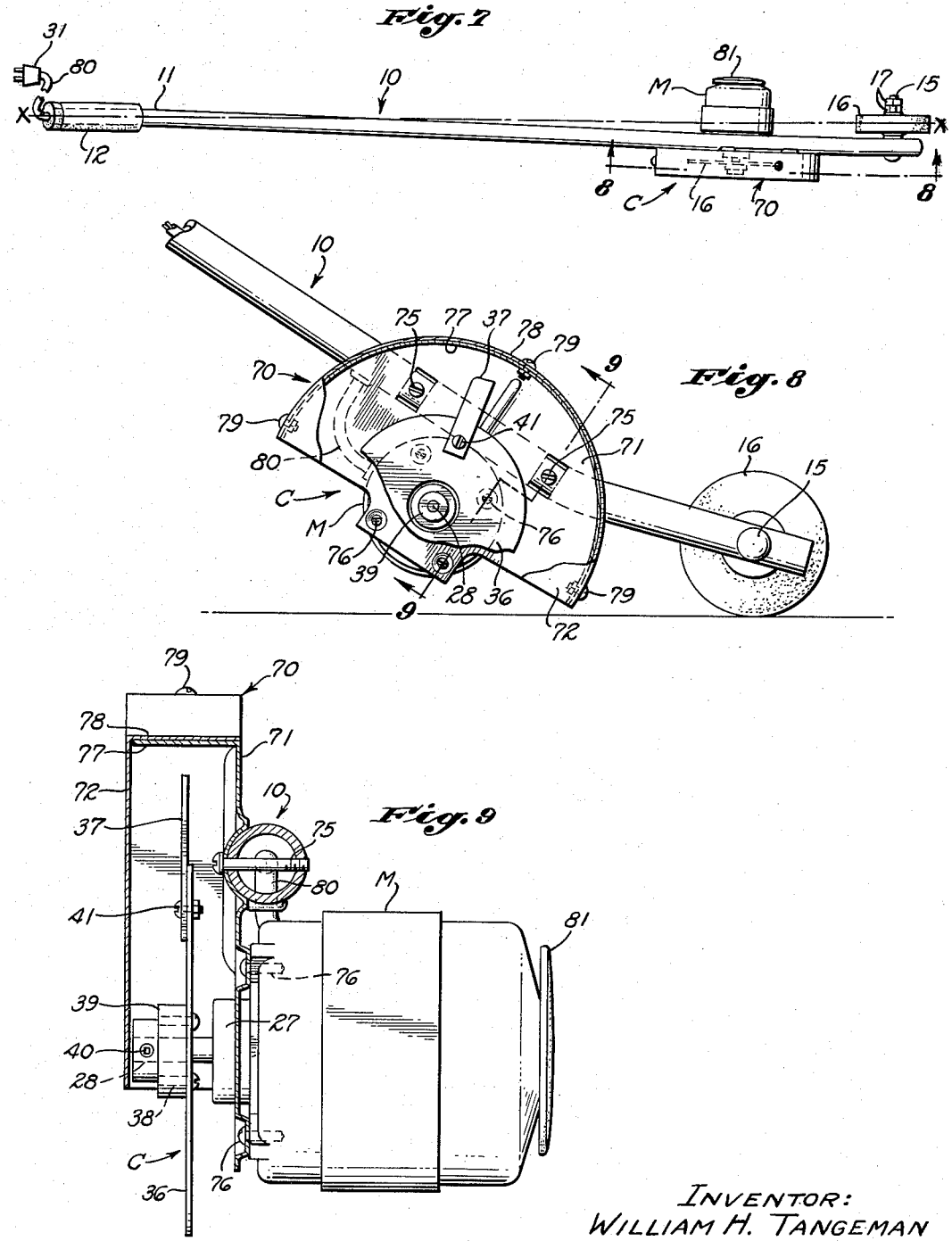

United States Patent Office 2,718,742
Patented Sept. 27, 1955

2,718,742

LAWN EDGER

William H. Tangeman, Ontario, Calif.

Application April 7, 1952, Serial No. 280,948

13 Claims. (Cl. 56—25.4)

This invention relates to mowing devices, with special reference to devices for cutting grass, and is directed specifically to an improved form of lawn edger.

Generally described, my lawn edger has a frame structure that slants downward from a rear elevated handle to a forward ground-engagement means such as a runner or a ground wheel. A suitable mowing or cutting means is carried by the structure and is positioned thereon to cut or trim the marginal portions of lawn areas. The general object of the invention is to provide an efficient power-actuated lawn edger of simple compact structure that is highly flexible in the sense of being adaptable to a variety of lawn-trimming tasks including tasks made especially difficult by obstacles and by irregular contours of walks adjacent lawn margins.

An important feature of the invention is that both the desired functional flexibility of the lawn edger and the desired structural simplicity are favored by what may be termed an underslung arrangement in which the frame structure is rotatable about a longitudinal axis and the lawn edger as a whole has a center of gravity below the axis of rotation. The rotary freedom of the structure permits the cutting means to be rocked through an arcuate path in a desirable manner for flexibility of operation. While the frame structure may be rotatable about a longitudinal axis terminating in any suitable ground-engaging means, a special advantage of the underslung arrangement is that it provides a gravitational tendency for the frame structure to maintain a desired normal position when a single ground-engaging means, such as a wheel, is used. In such a simplified construction the axis of the supporting wheel is rigid relative to the frame structure so that the whole lawn edger including the supporting wheel may rock laterally about a longitudinal axis passing through the lowermost peripheral portion of the wheel.

With further reference to simplicity of structure the inclined frame structure may be reduced to a single structural member, for example a single metal tube, with the upper end of the member serving as a handle for guiding the device along the edge of a lawn. Preferably the cutter means is a motor-driven rotary cutter operating on a transverse axis and is set back longitudinally of the frame member from the support wheel. When so positioned the cutter may be raised and lowered conveniently simply by raising and lowering the handle portion of the frame member to rock the structure about the axis of the support wheel as a fulcrum and control the cutting depth.

A further advantage is that the handle may be moved from side to side to shift the rotary cutter laterally as well as for the purpose of guiding the lawn edger. In addition to these two kinds of movement the frame is further free to rotate about the above-mentioned longitudinal axis for further flexibility in the operation of the cutter.

While the distribution of weight to place the center of gravity below the longitudinal axis of rotation may be accomplished in various ways, a feature of the preferred practice of the invention is that the desired distribution is accomplished by mounting the cutter motor in an underslung position on the frame structure. Preferably the rotary cutter is mounted to extend to one side of a single frame tube and the support wheel is mounted on the other side of the tube so that the cutter may operate over a lawn area adjacent a walk with the support wheel traveling on the margin of the walk.

A further feature of the preferred practice of the invention is the concept of positioning the rotary cutter with its plane of rotation slightly oblique to the line of travel of the device so that one edge of the rotary cutter may travel close to the edge of a cement walk and with the further result that the rotary cutter will cut a swath somewhat wider than its own thickness. It is apparent that this width may be increased by oscillation of the structure about the longitudinal axis of rotation.

A further feature of the preferred embodiment of the invention is that the rotary cutter is of the centrifugal type having centrifugal cutting elements movably mounted on a suitable rotor. Normally centrifugal force holds the cutting elements in radially extended positions for effective cutting operation, but when the cutting elements encounter obstacles such as rocks or the edge of a concrete walk, the cutting elements are simply deflected by the obstacles without substantial damage.

While such a lawn edger may be manipulated in any manner to bring the rotary cutter into operation along the margin of a grass area, an outstanding advantage of the invention is the ease of operation and simplicity of control that is experienced when the device is drawn toward the operator, the operator walking backward in the course of trimming the margin of a lawn area. When the centrifugal cutting elements operate they do not block vision and the operator may readily observe the cutting zone for guidance in manipulating the device. The guiding action is completely natural in the suggested mowing procedure since the rotary cutter follows every move of the elevated handle. The same natural guiding is not experienced in moving the support wheel forward.

The various objects and advantages of the invention will be apparent in the following detailed description of the presently preferred embodiment, considered with the accompanying drawings.

In the drawings, which are to be regarded as merely illustrative:

Fig. 1 is a side elevation of the preferred embodiment of the lawn edger;

Fig. 2 is a plan view;

Fig. 3 is a front elevation with a portion of the frame structure broken off;

Fig. 4 is an enlarged sectional view taken as indicated by the broken line 4—4 of Fig. 1;

Fig. 5 is an enlarged fragment of the rotary cutter;

Fig. 6 is a fragmentary plan view of a modified form of the invention;

Fig. 7 is a plan view of another embodiment of the invention;

Fig. 8 is a fragmentary side elevation of the embodiment shown in Fig. 7; and

Fig. 9 is an enlarged section taken along the line 9—9 of Fig. 8.

As best shown in Figs. 1 and 2, the frame structure of the lawn edger comprises a single tubular frame member 10, the upper end of which is a handle portion 11 embraced by a suitable handle member 12 of rubber or the like. It is contemplated that this structure will rotate about a longitudinal axis and, as heretofore mentioned, I prefer to avoid the necessity of a rotary joint or bearing for this purpose by simply mounting the structure on a single support wheel for rotation about the point of contact between the periphery of the wheel and the surface on which it rests.

In the construction shown, a suitable spindle or stub axle 15 extending through the lower end of the tube 10 journals a suitable support wheel 16 retained thereon by a pair of nuts 17.

While the longitudinal axis of rotation will pass through the lowermost peripheral portion of the support wheel 16 in all instances, the direction in which this axis extends will depend upon the manner in which the device is manipulated by the operator. Preferably, the lower end portion of the frame tube 10 is bent slightly upward to lesser angle relative to the horizontal as may be seen in Fig. 1, and the previously mentioned handle portion 11 is bent slightly downward to a lesser angle relative to the horizontal. With such a construction and with the device grasped by the operator in the position shown in Fig. 1, simple rotation of the handle member 12 by a twist of the operator's wrist will cause the whole structure to rock about a longitudinal axis extending approximately along the line $x$–$x$ in Figs. 1 and 2, the axis extending through the point at which the support wheel 16 contacts the surface on which it rests. It will be noted in Fig. 1 that the upward bend at the lower end of the frame tube 10 causes the axis of rotation $x$–$x$ to lie relatively close to the lower bend in the frame tube and relatively close to the physical axis or center line of the frame tube.

The rotary cutter means, generally designated C, which is driven by a motor M rotates on a transverse axis in an upright plane of rotation, and, as heretofore indicated, it is contemplated that the center of gravity of the lawn edger as a whole will lie below the axis of rotation $x$–$x$ to provide a gravitational tendency for the plane of rotation of the rotary cutter C and the plane of rotation of the support wheel 16 to remain upright. This gravitational tendency is provided simply by mounting the motor M below the axis of rotation $x$–$x$ on a suitable bracket plate 20.

The bracket plate 20 is formed with an upper curved portion to overlie the upper side of the frame tube 10 and is suitably anchored to the frame tube by suitable bolts 22 and nuts 23. The motor M is attached to the bracket plate 20 by suitable screws 25 and the bracket plate has a central aperture to clear a motor bearing 27, through which bearing extends a motor shaft 28, as shown in Fig. 4.

The motor M is energized by means of a pair of conductors in a suitable flexible cord 30 that terminates in the usual plug 31 and is connected with a suitable switch 32 near the handle member 12. The cord 30 extends from the upper side of the motor M along the frame tube 10 and may be suitably attached to the frame tube by one or more clips 33.

The rotary cutter C is preferably of the centrifugal type comprising a rotor plate 36 on which at least two cutting elements 37 are flexibly mounted. As shown in Figs. 4 and 5 the rotor plate 36 is mounted by screws 38 on a metal hub body 39 which in turn is mounted on the rotor shaft 28 and secured thereto by a suitable set screw 40. In the construction shown the cutting elements 37 are in the form of metal straps or blades that are pivotally mounted on the rotor plate 36 by suitable means such as bolts 41. Preferably the direction of rotation of the rotary cutter is in the direction indicated by the arrows in Figs. 1 and 5 with the lower portion of the cutter rotating forward toward the support wheel 16. One advantage of this direction of rotation is that the cutting action is down as the operator walks backward and the result is a smoother cut than would be obtained by upward cutting action. Another advantage is that the rotation is in a safe direction relative to the operator and any objects struck by the cutting elements will be thrown in a direction away from the operator.

It is contemplated that the cutter C will be provided with a suitable guard to protect the operator in the event of accidental release of one of the cutting elements 37 and a feature of the invention is that such a guard need not interfere with observation of the cutting zone on the part of the operator since only the forward and upper peripheral regions of the cutter need be confined when the cutter rotates in the direction indicated.

The construction shown in the drawings includes a guard 45 in the form of a semi-circular plate formed with a peripheral flange 46 to overhang the rotary path of the cutting elements 37. As shown in Fig. 4, the inner edge 47 of the guard 45 is cut away liberally to clear the hub body 39 of the rotor plate 36 and the guard is supported by bolts 48 on a pair of offset brackets 49 that are anchored to the previously mentioned bracket plate 20 by the screws 25 that retain the motor M. If desired, an outer plate 50 may be added to the guard 45. The outer plate 50 is of the same general semi-circular configuration and is formed with a peripheral flange 51 to overlie the previously mentioned peripheral flange 46 of the guard. Suitable bolts 52 extending through the two flanges 46 and 51 releasably retain the outer plate 50 in place.

In the preferred practice of the invention, the axis of rotation of the cutter C is divergent or non-parallel with respect to the axis of rotation of the support wheel 16, so that the rotary cutter C is at least slightly oblique relative to the direction of its path as it is carried along by the support wheel 16. The divergence of the two axes for this purpose may be provided in various ways.

In the form of the invention shown in Figs. 1 to 5, the axis of rotation of the cutter C is normal to the plane of the portion of the frame member 10 that inclines upward from the cutter but the axis of the support wheel 16 is non-perpendicular to that plane. This relationship of the two axes is accomplished simply by providing a slight bend in the lower end of the frame tube 10 to swing the lower end slightly away from that plane as may be seen in Fig. 2. It is apparent from Fig. 2 that movement of the device in the plane of rotation of the support wheel 16 will carry the cutter C in the desired oblique position.

If desired, the lawn edger may be provided with suitable guide means to facilitate the trimming of a lawn area, for example, the lawn adjacent a concrete sidewalk 55. Such a guide means may comprise, for example, a suitable metal strap 56 which extends downward to contact the side surface 57 of the sidewalk. Preferably the guide strap 56 is pivotally mounted by a bolt 58 on the guard 45 near the rear edge of the guard as shown. Normally the guide strap 56 extends downward in abutment against a stop pin 60 on the guard 45 (Fig. 4) but may, when desired, be swung to an upper position out of the way in abutment against a second stop pin 61.

Fig. 6 shows a modification of the invention in which the converging relationship between the axis of the cutter C and the axis of the support wheel 16 is provided by, in effect, turning the axis of the cutter relative to the frame tube 10 instead of turning the axis of the support wheel. In this modification of the invention, the frame tube 10 as seen from above is straight throughout and the axis of the support wheel 16 is normal to the plane of the frame tube. The desired divergent relationship between the two axes is provided by mounting the motor M and cutter C slightly askew on the frame tube 10, this object being accomplished by correspondingly distorting or twisting the bracket plate 20.

The operation of the described lawn edger may be readily understood from the foregoing description. With the support wheel 16 resting on the margin of a sidewalk and the switch 32 closed to energize the motor M, the centrifugal cutter C will operate at a suitable rotary velocity, for example, at 3,000 R. P. M., and centrifugal force will cause the cutting elements 37 to extend radially from the rotor plate 36 to cut grass in the path of rotation. The cutting zone defined by the orbits of the cutting elements 37 will be plainly visible to the operator for his guidance as he draws the device toward himself.

With the guide 56 against the side surface of the walk the edge of the rotary cutter nearest the operator, as the operator walks backward, is positioned obliquely to travel very close to the edge of the sidewalk. This rotating edge is fully visible for the operator's benefit in guiding the device and he may guide this edge close to the sidewalk without concern for the opposite edge since the opposite edge is liberally spaced from the sidewalk.

The obliquely positioned rotary cutter C will cut a swath wider than the blade thickness. The swath may be widened as desired by oscillating the lawn edger about the axis of rotation x—x and/or swinging the handle of the lawn edger laterally to reciprocate the rotary cutter toward and away from the edge of the walk. Such oscillation and reciprocation may also be used to mow small areas of lawn with the support wheel 16 resting directly on the lawn, e. g., areas adjacent walls or around sprinklers.

The third form of the invention shown in Figs. 7, 8 and 9 is, in general, similar to the above described forms as indicated by the use of corresponding numerals and letters to indicate corresponding parts. As in the first form of the invention, the divergent relationship between the axis of rotation of the cutter C and the axis of rotation of the support wheel 16 is provided by a slight bend in the lower end of the frame tube 10. Thus, the plane of rotation of the cutter C is slightly oblique to the line of travel of the ground wheel 16.

A feature of this last embodiment of the invention with respect to simplicity is the use of a guard for the rotary cutter C that also serves the purpose of supporting motor M. The guard, generally designated 70, extends around approximately half of the periphery of the cutter C as before. It may be made in two sections, an inner section 71 and an outer section 72. The inner section 71 is a sheet metal member that is suitably shaped for attachment to the frame tube 10 and for mounting of the motor M. Suitable screws 75 fasten the inner section 71 to the frame tube 10 and screws 76 serve to mount the motor M on the inner section. The inner section 71 has a peripheral flange 77 and the outer section 72 has a similar peripheral flange 78, these two flanges lying against each other and being interconnected by short bolts 79 to form a peripheral wall of double thickness.

Further simplicity is achieved by using an electric cord 80 that extends longitudinally through the frame tube 10 instead of being mounted on the exterior of the frame tube. This third form of the invention also includes a guard or bumper for the motor M in the form of a rubber disc 81 mounted on the upper end of the motor to absorb the shock of accidental impact.

The detailed description of the presently preferred embodiment of the invention will suggest to those skilled in the art various changes, substitutions and other departures that properly lie within the spirit and scope of the appended claims.

I claim as my invention:

1. In a lawn edger the combination of: an inclined frame structure having a handle portion at its upper end; a support wheel carried by said frame structure adjacent the lower end thereof, said frame structure having a longitudinal axis passing through the lowermost peripheral portion of said support wheel about which axis the frame structure is pivotable upon rotation of said handle; a rotary cutter carried by said frame structure with the axis of rotation of the cutter extending in a direction laterally of said longitudinal axis of rotation; and means carried by said frame structure to actuate said rotary cutter, the center of gravity of the lawn edger as a whole being offset from said longitudinal axis of rotation in a downward direction to cause the lawn edger when supported by said handle portion and said ground-engagement means to seek a position with the plane of rotation of said cutter upright.

2. A lawn edger as set forth in claim 1 in which said rotary cutter comprises a rotor and at least one centrifugal cutting element extending flexibly therefrom.

3. A lawn edger as set forth in claim 1 in which said frame structure comprises an elongated tubular member, the lower end portion of which is inclined upwardly from the balance of the tubular member.

4. In a lawn edger the combination of: an inclined frame structure having a handle portion at its upper end, said frame structure having a longitudinal axis extending from said handle portion to a point below the lower end thereof about which axis said frame structure is rotatable; ground-engagement means mounted on the lower end of said frame structure, a rotary cutter carried by said frame structure with the axis of rotation of the cutter extending in a direction laterally of said longitudinal axis of rotation, said rotary cutter being near said lower end of the frame structure in a zone between said ground-engaging means and said handle portion; and a motor carried by said frame structure to actuate said rotary cutter, the center of gravity of the lawn edger as a whole being offset from said longitudinal axis of rotation in a downward direction to cause the lawn edger when supported by said handle portion and said ground-engagement means to seek a position with the plane of rotation of said cutter upright.

5. A lawn edger as set forth in claim 4 in which said rotary ground-engagement means is a single support wheel with said longitudinal axis of rotation passing through the lowermost peripheral point of the support wheel.

6. A lawn edger as set forth in claim 4 in which said rotary cutter comprises a rotor and at least one centrifugal cutting element movably mounted thereon and extending therefrom under the action of centrifugal force.

7. A lawn edger as set forth in claim 5 in which both said support wheel and the center of gravity of said motor are offset to the same side from said frame structure.

8. A lawn edger as set forth in claim 7 in which said rotary cutter is offset to the other side of said frame structure.

9. In a lawn edger the combination of: an elongated integral frame member which when disposed in operative position extends obliquely upwardly with respect to a surface on which said lawn edger is disposed, said frame member having a lower end portion disposed in substantial parallelism with said surface, an upper handle portion and a main portion between said lower end portion and said handle portion; a single support wheel carried by said lower end portion of the frame member and offset to one side thereof; a rotary cutter carried by said main portion of the frame member, said cutter being laterally spaced from said frame member and having an axis of rotation disposed in a plane parallel with said surface; and a motor carried by said main portion of the frame member to drive said rotary cutter, said motor being suspended from and below said main portion of the frame member and having its axis of rotation coincident with said axis of rotation of said rotary cutter.

10. In a lawn edger the combination of: an elongated integral frame member which when disposed in operative position extends obliquely upwardly with respect to a surface on which said lawn edger is disposed, said frame member having a lower end portion disposed in substantial parallelism with said surface, an upper handle portion and a main portion between said lower end portion and said handle portion; a single support wheel carried by said lower end portion of the frame member and offset to one side thereof; a depending support bracket affixed to said main portion of the frame member; a transverse opening in said bracket; a motor mounted in said opening and extending laterally to one side of said main portion of the frame member; a rotary cutter carried by said motor and disposed at the opposite side of said main portion of the frame member, said cutter being actuated by said motor and having an axis of rotation coincident therewith; and a cutter guard mounted on said support bracket and partly enclosing said rotary cutter.

11. In a lawn edger, the combination of: an elongated frame having upper and lower ends when said lawn edger is disposed in an upright position, said frame having a handle at said upper end and having a ground engaging wheel at said lower end; and a rotary cutter and a drive motor therefor carried by said frame intermediate said ends thereof and located below said frame when said lawn edger is in its upright position, thereby locating the center of gravity of said lawn edger below said frame so that said lawn edger inherently tends to assume its upright position when supported by said wheel and an upward force is applied to said handle.

12. In a lawn edger, the combination of: a frame; a ground engaging wheel on said frame and rotatable about a horizontal axis when said lawn edger is in its upright position; and a rotary cutter on said frame and rotatable about a horizontal axis when said lawn edger is in its upright position, the axes of rotation of said wheel and said cutter being nonparallel so that when said lawn edger is in its upright position, said wheel and said cutter rotate in vertical planes which are nonparallel.

13. A lawn edger as defined in claim 12 including a drive motor for said cutter, said cutter and said drive motor being carried by and located below said frame so as to locate the center of gravity of said lawn edger below said frame.

References Cited in the file of this patent

UNITED STATES PATENTS

| | | |
|---|---|---|
| D. 163,486 | Sanford | May 29, 1951 |
| 1,753,132 | Ruebel | Apr. 1, 1930 |
| 1,868,918 | Schenk | July 26, 1932 |
| 2,464,695 | Landrum | Mar. 15, 1949 |
| 2,478,813 | Esleck | Aug. 9, 1949 |
| 2,608,043 | Berdan | Aug. 26, 1952 |